US010002334B1

(12) United States Patent
Ross et al.

(10) Patent No.: US 10,002,334 B1
(45) Date of Patent: Jun. 19, 2018

(54) ANALYTICAL METHOD, SYSTEM AND COMPUTER READABLE MEDIUM TO PROVIDE HIGH QUALITY AGENT LEADS TO GENERAL AGENTS

(71) Applicant: MASSACHUSETTS MUTUAL LIFE INSURANCE COMPANY, Springfield, MA (US)

(72) Inventors: Gareth Ross, Amherst, MA (US); Tricia Walker, West Hampton, MA (US)

(73) Assignee: Massachusetts Mutual Life Insurance Company, Springfield, MA (US)

(*) Notice: Subject to any disclaimer, the term of this patent is extended or adjusted under 35 U.S.C. 154(b) by 273 days.

(21) Appl. No.: 14/576,572

(22) Filed: Dec. 19, 2014

Related U.S. Application Data (60) Provisional application No. 61/921,718, filed on Dec. 30, 2013.

(51) Int. Cl.
*G06Q 10/06* (2012.01)
(52) U.S. Cl.
CPC ............................ *G06Q 10/063112* (2013.01)
(58) Field of Classification Search
None
See application file for complete search history.

(56) References Cited

U.S. PATENT DOCUMENTS

| | | | |
|---|---|---|---|
| 5,551,880 A | 9/1996 | Bonnstetter et al. | |
| 9,542,452 B1 | 1/2017 | Ross et al. | |
| 2001/0034011 A1 | 10/2001 | Bouchard | |
| 2004/0054553 A1* | 3/2004 | Zizzamia | G06Q 10/063 705/4 |
| 2004/0088177 A1 | 5/2004 | Travis et al. | |
| 2006/0020509 A1* | 1/2006 | Strain | G06Q 10/109 705/14.25 |
| 2006/0233346 A1* | 10/2006 | McIlwaine | G06Q 10/06 379/265.02 |
| 2008/0208777 A1 | 8/2008 | Stephens | |
| 2009/0006173 A1 | 1/2009 | Farrell et al. | |
| 2009/0006178 A1 | 1/2009 | Taylor et al. | |
| 2012/0245963 A1 | 9/2012 | Peak et al. | |

(Continued)

*Primary Examiner* — Matthew S Gart
*Assistant Examiner* — Akosua Kyereme-Tuah
(74) *Attorney, Agent, or Firm* — Eric L. Sophir; Dentons US LLP (57) ABSTRACT

A system and a method for identifying, ranking, and matching agents are disclosed herein. The system may include an analytical engine which may collect information from external and internal databases. The analytical engine may use the information collected from these databases, in addition to a success criteria, for determining one or more success factors or key attributes of successful agents. An algorithm within the analytical engine may compute probabilities, trends and variability analysis for determining the impact of the defined key attributes in the successful career developments for prospective or active agents. The analytical engine may identify prospective agents and match them to suitable general agents. A list of agents' leads, ranking reports, and ongoing assessments may be communicated or supplied to general agents through the use of agent computing devices operatively coupled with the analytical engine.

15 Claims, 5 Drawing Sheets

(56) References Cited

U.S. PATENT DOCUMENTS

| | | | |
|---|---|---|---|
| 2013/0085805 A1* | 4/2013 | Kursar | G06O 30/0201 |
| | | | 705/7.29 |
| 2013/0132360 A1 | 5/2013 | Kuznetsov et al. | |
| 2013/0243179 A1* | 9/2013 | Thomson | H04M 3/00 |
| | | | 379/265.12 |
| 2013/0290210 A1 | 10/2013 | Cline et al. | |
| 2013/0326375 A1 | 12/2013 | Barak et al. | |

* cited by examiner

ANALYTICAL METHOD, SYSTEM AND COMPUTER READABLE MEDIUM TO PROVIDE HIGH QUALITY AGENT LEADS TO GENERAL AGENTS

CROSS-REFERENCE TO RELATED APPLICATIONS

This application claims the benefit of the filing date of the U.S. Provisional Application No. 61/921,718, entitled "Analytical Methods To Provide High Quality Agent Leads To General Agents," filed on Dec. 30, 2013, which is incorporated herein by reference in its entirety.

This application relates to U.S. Provisional Patent Application Ser. No. 61/922,127, filed Dec. 31, 2013, U.S. Provisional Patent Application Ser. No. 61/921,725, filed Dec. 30, 2013, and U.S. Provisional Patent Application Ser. No. 61/921,732, filed Dec. 30, 2013, which are hereby incorporated by reference in their entirety.

FIELD OF THE INVENTION

The present disclosure relates in general to systems and methods for career management, and more specifically, to methods and systems for determining and ranking attributes.

BACKGROUND

Insurance or financial companies usually spend significant amount of time and resources in developing agents' careers. For example, considering the cost of attrition, the development of successful agents may include costs of in the excess of about $300 k and a span of at least 2 to 5 years.

What is needed are systems and methods that may improve the flow and likelihood of success of agents. It may be also needed to provide systems and methods capable of determining the attributes of successful agents, while also matching them to the most suitable fit general agent.

SUMMARY

A system and a method for identifying and ranking agents are disclosed herein. Embodiments of the system and method may determine one or more success factors or key attributes that may be used for estimating the probability of success for active and/or prospective agents.

In one embodiment, a computer-implemented method comprises accessing, by an analytical engine of a computer, a plurality of databases storing a record associated with a selected agent to obtain information about the agent in the record; selecting, by the analytical engine of the computer, one or more agent attributes from the information in the database record associated with the agent, the one or more agent attributes indicative of a likelihood of agent success, wherein each agent attribute has a timeframe for the agent attribute to become indicative of success; performing, by the analytical engine of the computer, predictive analysis on the one or more selected agent attributes to determine the likelihood of agent success.

In another embodiment, a system comprises a computer readable memory having stored thereon computer executable instructions for quantifying likelihood of agent success by an analytical engine of a computer; and a processor coupled to the memory, the processor executing the instructions via the analytical engine, the instructions including:

accessing a plurality of databases storing a record associated with a selected agent to obtain information about the agent in the record; selecting one or more agent attributes from the information in the database record associated with the agent, the one or more agent attributes indicative of a likelihood of agent success, wherein each agent attribute has a timeframe for the agent attribute to become indicative of success; performing predictive analysis on the one or more selected agent attributes to determine the likelihood of agent success In yet another embodiment, a non-transitory computer readable medium having stored thereon computer executable instructions for quantifying likelihood of agent success by an analytical engine of a computer, the instructions when executed by a processor perform a method comprises accessing, by the processor, a plurality of databases storing a record associated with a selected agent to obtain information about the agent in the record; selecting, by the processor, one or more agent attributes from the information in the database record associated with the agent, the one or more agent attributes indicative of a likelihood of agent success, wherein each agent attribute has a timeframe for the agent attribute to become indicative of success; performing, by the processor, predictive analysis on the one or more selected agent attributes to determine the likelihood of agent success.

The disclosed system and method may automatically identify and rank prospective agents or active agents, while also providing agent leads to general agents, thereby assisting the career development of agents and the recruitment/ supervision work of general agents.

Additional features and advantages can become apparent from the detailed descriptions which follow, taken in conjunction with the accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Agent" refers to an individual working for a company or as a broker with an interest in attracting new clients by analyzing their needs and wishes. An agent may specifically look for prospects with high referral potential. In addition, an agent may represent the intermediary between an issuing company and a client.

"General Agent" refers to an individual who may supervise the work of agents and may be in charge of their recruitment and training.

"Attributes" refers to one or more characteristics that may be relevant for ranking and/or evaluating the performance of agents.

"Analytical engine" refers to a software module that handles data integration, breaks data streams into atomic parts, executes rules, and performs data matching by using fuzzy logic, among others.

Figure 1:
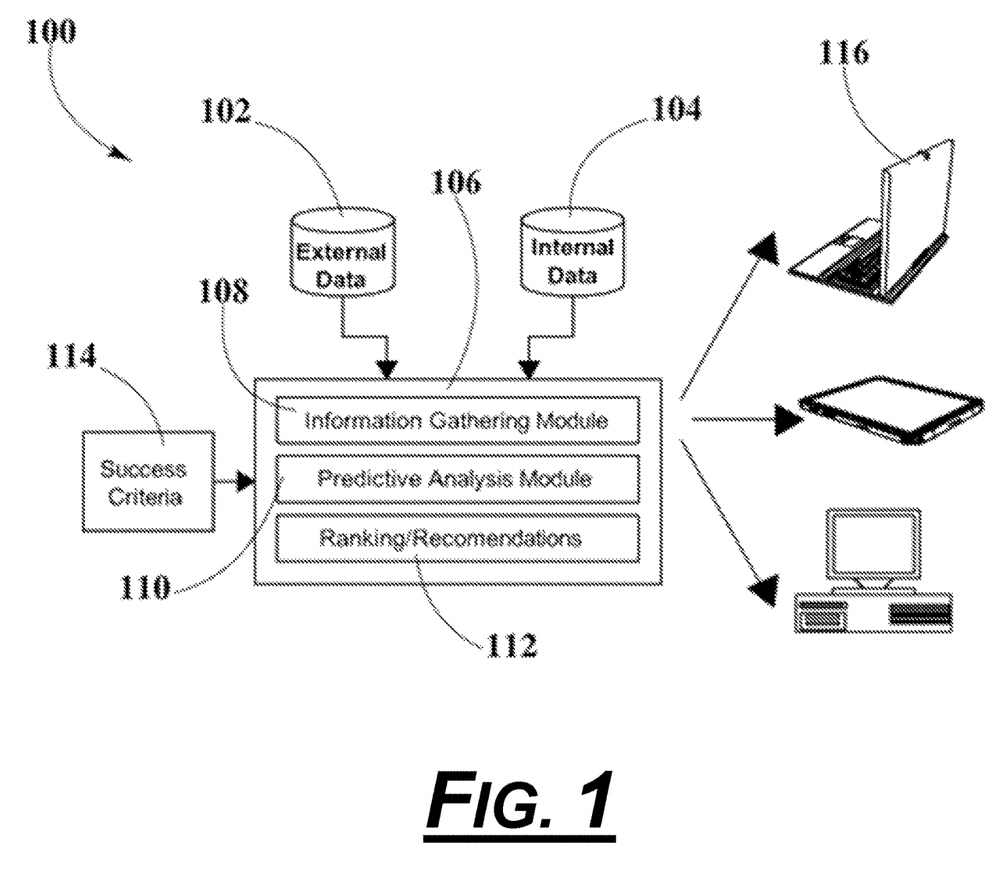
FIG. 1 illustrates an exemplary system architecture for the identification, ranking, and matching of agents in accordance with an embodiment.

FIG. 1 illustrates a block diagram of an exemplary system 100 for identifying and ranking successful agents. According to some aspects of this embodiment, system 100 may be capable determining predictive success factors for allowing the identification, ranking, and recommendation of agents.

System 100 may include an external database 102 where external information about potential or current agents can be stored. External database 102 can be fed from websites, social media and networks, and referrals, among others. In one embodiment, information stored in external database 102 may be supplied by recruitment or job agencies. Examples of external information may include resumes, job history, recommendations, demographic, social and behavioral data, among others. Similarly, system 100 may also include an internal database 104 where the profiles, and performance or historical sales data of active agents may be stored. Active agents may be considered current workers of the financial or insurance company which may have dedicated profiles for each agent.

External database 102 and internal database 104 may be housed locally or remotely, for instance, in a secure, scalable facility. For security and reliability, redundancy may be employed. Examples of external database 102 and internal database 104 may include MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

System 100 may include an analytical engine 106 which may be operatively coupled with external database 102 and internal database 104 through suitable network connections that may include intranets, local area networks (LAN), the cloud, virtual private networks (VPN), wireless area networks (WAN) and the internet among others.

Analytical engine 106 may include a processing unit for executing algorithms or computer-executable program instructions related to the operation of an information gathering module 108, a predictive analysis module 110, and a rating/recommendation module 112. In one embodiment, each software module 108, 110, 112 may include a separate processing unit for running related algorithms or computer executable program instructions. The processing unit may include a processor with computer-readable medium, such as a random access memory (RAM) (not shown) coupled to the processor. Examples of processors may include a microprocessor, application specific integrated circuit (ASIC), and field programmable object array (FPOA), among others. Each central processing unit may be a component of computing devices such as a server, a single computer, or multiple computers in a distributed configuration. In another embodiment, predictive analysis module 110 may be implemented remotely through a software module in communication with analytical engine 106.

A success criteria 114 may be fed to analytical engine 106 for evaluating what may be considered a successful agent operation. The success criteria may include a combination of metrics and/or goals that can be used for evaluating the performance and success of agents. The success criteria may vary according to internal business and human development considerations of the insurance or financial company, and it may also consider external factors such as market performance and competition.

According to an embodiment, information gathering module 108 may access and process agent information from external database 102 and internal database 104.

In one embodiment, information gathering module 108 may feed the collected and processed information from the databases 102, 104 into predictive analysis module 110 to determine key attributes that may be used for predicting the likelihood of success for prospective or current agents.

In one embodiment, ranking/recommendation module 112 may use the results or key attributes computed or identified by predictive analysis module 110 for identifying and ranking prospective agents, in addition to providing evaluation and ranking reports on current or active agents.

Ranking/recommendation module 112 may be operatively coupled with one or more agent computing devices 116 through suitable network connections that may include intranets, local area networks (LAN), the cloud, virtual private networks (VPN), wireless area networks (WAN) and the internet among others. Agent computing devices 116 may be owned or operated by general agents or agents. Examples of agent computing devices 116 include, but are not limited to, smartphones, desktop computers, laptop computers, tablets, and PDAs, among others.

Figure 2:
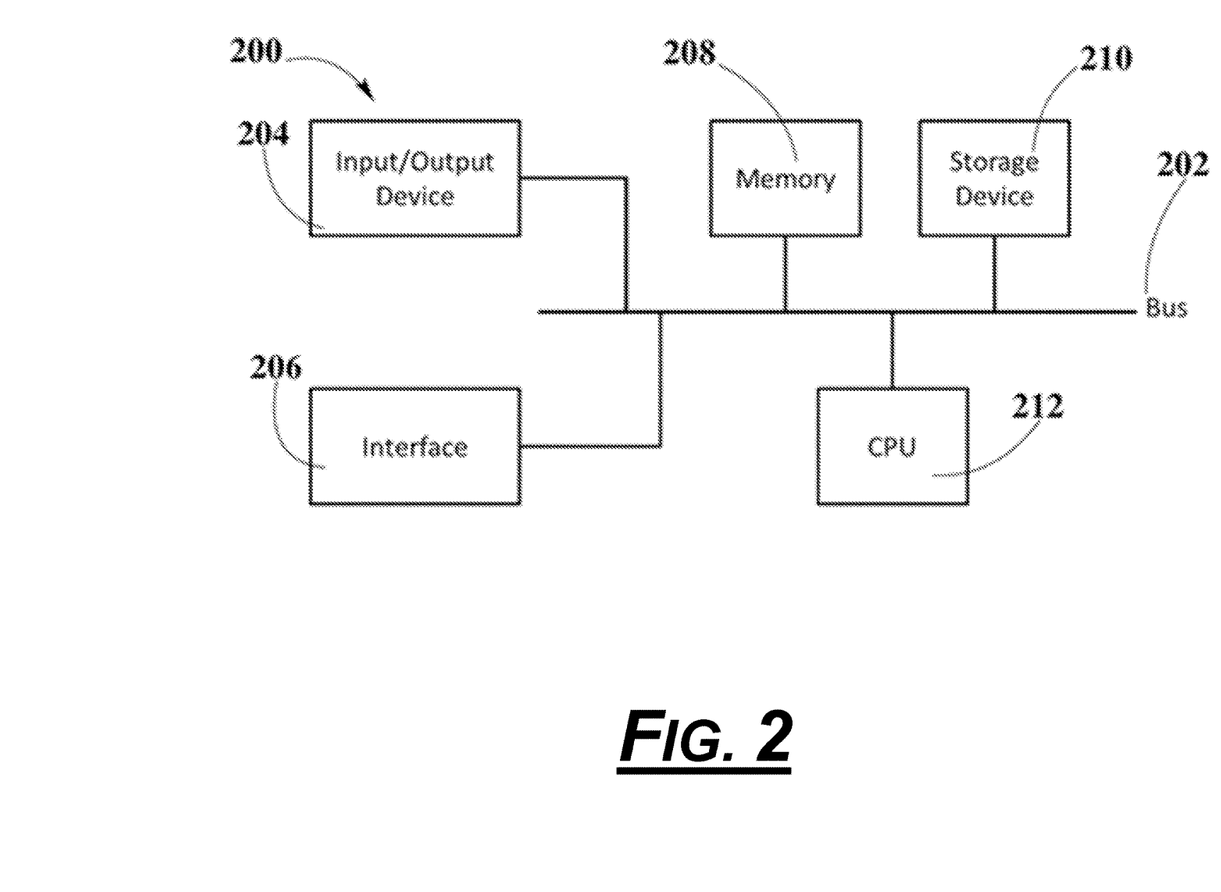
FIG. 2 illustrates an exemplary computing device that may be included as a component of the system architecture of FIG. 1, according to an exemplary embodiment.

FIG. 2 is an exemplary computing device 200 in which one or more embodiments of the present disclosure may operate, according to an embodiment. In FIG. 2, computing device 200 includes bus 202, input/output (I/O) device 204, communication interface 206, memory 208, storage device 210 and central processing unit 212. In another embodiment, computing device 200 includes additional, fewer, different, or differently arranged components than those illustrated in FIG. 2.

In FIG. 2, bus 202 is in physical communication with (I/O) device 204, communication interface 206, memory 208, storage device 210, and central processing unit 212. Bus 202 includes a path that permits components within computing device 200 to communicate with each other. Examples of (I/O) device 204 include peripherals and/or other mechanisms that may enable a user to input information to computing device 200, including a keyboard, computer mice, buttons, touch screens, voice recognition, and biometric mechanisms, and the like. (I/O) device 204 also includes a mechanism that outputs information to the user of computing device 200, such as, a display, a light emitting diode (LED), a printer, a speaker, and the like.

Examples of communication interface 206 include mechanisms that enable computing device 200 to communicate with other computing devices and/or systems through network connections. Examples of network connections include any suitable connections between computers, such as, intranets, local area networks (LANs), virtual private networks (VPNs), wide area networks (WANs), the Internet, and the like. Examples of memory 208 include random access memory 208 (RAM), read-only memory (ROM), flash memory, and the like. Examples of storage device 210 include magnetic and/or optical recording medium, ferroelectric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 can be implemented as part of analytical engine 106, agent computing devices 116, and the like. Examples of these implementations include servers, authorized computing devices, smartphones, desktop computers, laptop computers, tablet computers, PDAs, another type of processor-controlled device that may receive, process, transmit digital data, and the like. Additionally, computing device 200 may perform certain operations that are required for the proper operation of system architecture 100. Suitable computing devices 200 may perform these operations in response to central processing unit 212 executing software instructions contained in a computer-readable medium, such as memory 208.

In one embodiment, the software instructions of the system are read into memory 208 from another memory location, such as storage device 210, or from another computing device 200 (e.g., computing devices 124, and the like) via communication interface 206. In this embodiment, the software instructions contained within memory 208 cause central processing unit 212 to perform processes that will be described in FIG. 5, below. Alternatively, hardwired circuitry may be used in place of or in combination with software instructions to implement processes described herein. Thus, implementations described herein are not limited to any specific combination of hardware circuitry and software.

Figure 3:
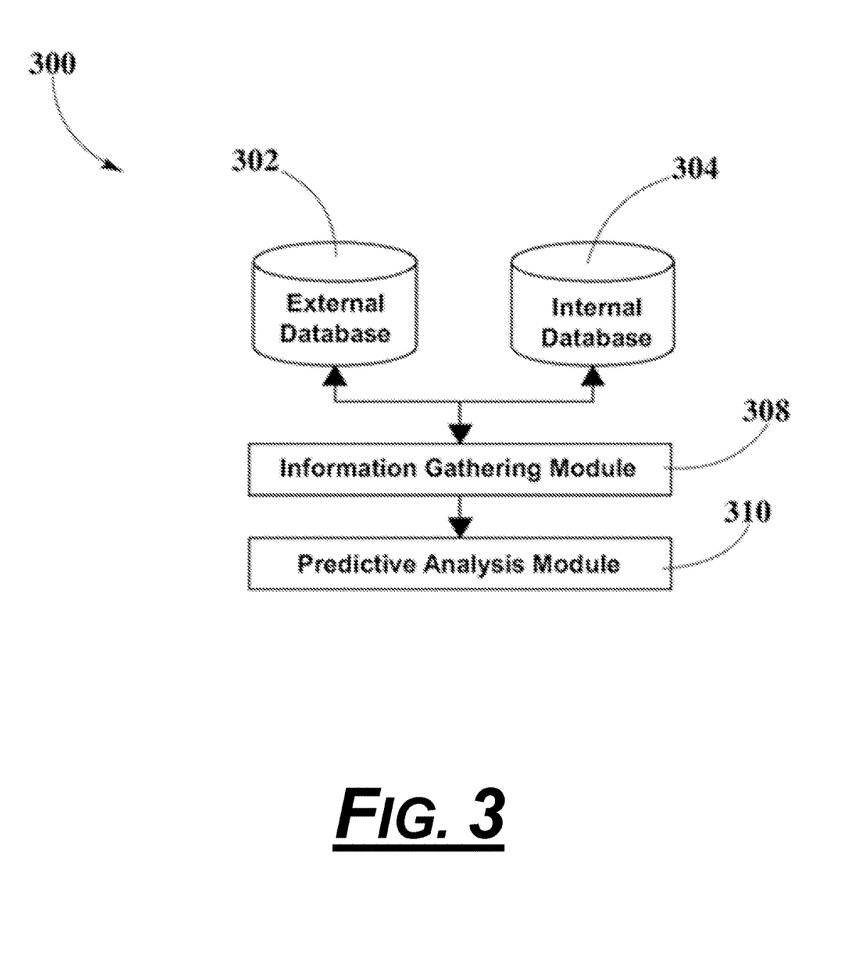
FIG. 3 illustrates a functional block diagram of a portion of an analytical engine for identifying and ranking successful agents, according to an exemplary embodiment.

FIG. 3 is an exemplary subsystem 300 that includes a portion of analytical engine 106 as well as other components of system architecture 100 for identifying successful agents. Subsystem 300 includes an external database 302, an internal database 304, an information gathering module 308, and a predictive analysis module 310. It should be understood that analytical engine 106 can include less components, more components, or different components depending on the desired analysis goals. In an example, referring to FIG. 1, said information gathering module 308 and predictive analysis module 310 are implemented as information gathering module 108 and predictive analysis module 110 in system architecture 100 respectively.

Information gathering module 308 is implemented as one or more computer software modules that include programmatic rules or logic for executing/running different user interfaces for gathering or collecting data from external database 302 and internal database 304. Information gathering module 308 is operatively connected to external database 302 and internal database 304 through suitable network connections that may include intranets, local area networks (LAN), the cloud, virtual private networks (VPN), wireless area networks (WAN) and the internet among others. In one embodiment, information gathering module 308 collects information about potential or prospective agents from external database 302 which can be fed from websites, social media and networks, and referrals, among others. Information collected from external database 302 can include resumes, job history, recommendations, demographic, social and behavioral data. In one embodiment, information gathering module 308 collects information about current or active agents from internal database 304, where this information can include profiles, performance and/or historical sales data of active agents. In one embodiment, internal database 304 can be part of an insurance or financial company having stored information about current or active agents.

In another embodiment, information gathering module 308 can directly access online content or information for determining suitable information that may be used for the derivation of predictive success factors, as well as the ranking and selection of prospective agents.

Predictive analysis module 310 includes an algorithm that can be used for determining predictive success factors. In one embodiment, information gathering module 308 provides agent information collected from databases 302, 304 to predictive analysis module 310, which can use this information in order to determine key attributes for predicting the likelihood of success of prospective and active agents. Examples of key attributes may include knowledge of the products to offer, college education and related professional licenses, people and communication skills, accessibility, intelligence coefficient, personality, quality of service provided to clients, experience, and periodic evaluation reports, among others. According to some aspects of this embodiment, the algorithm in the predictive analysis module 310 can perform quantitative and qualitative analysis on each of the key attributes or predictive success factors for weighting their impact in the likelihood of success for potential and current agents. In addition, the algorithm in predictive analysis module 310 may determine time frames necessary for the development of each predictive factor or key attribute. For example, the algorithm in predictive analysis module 310 may determine that the timeframe for the agent's acquisition of suitable knowledge regarding the array and characteristics of products offered by the financial or insurance company may range from about 1 to 2 years.

Figure 4:
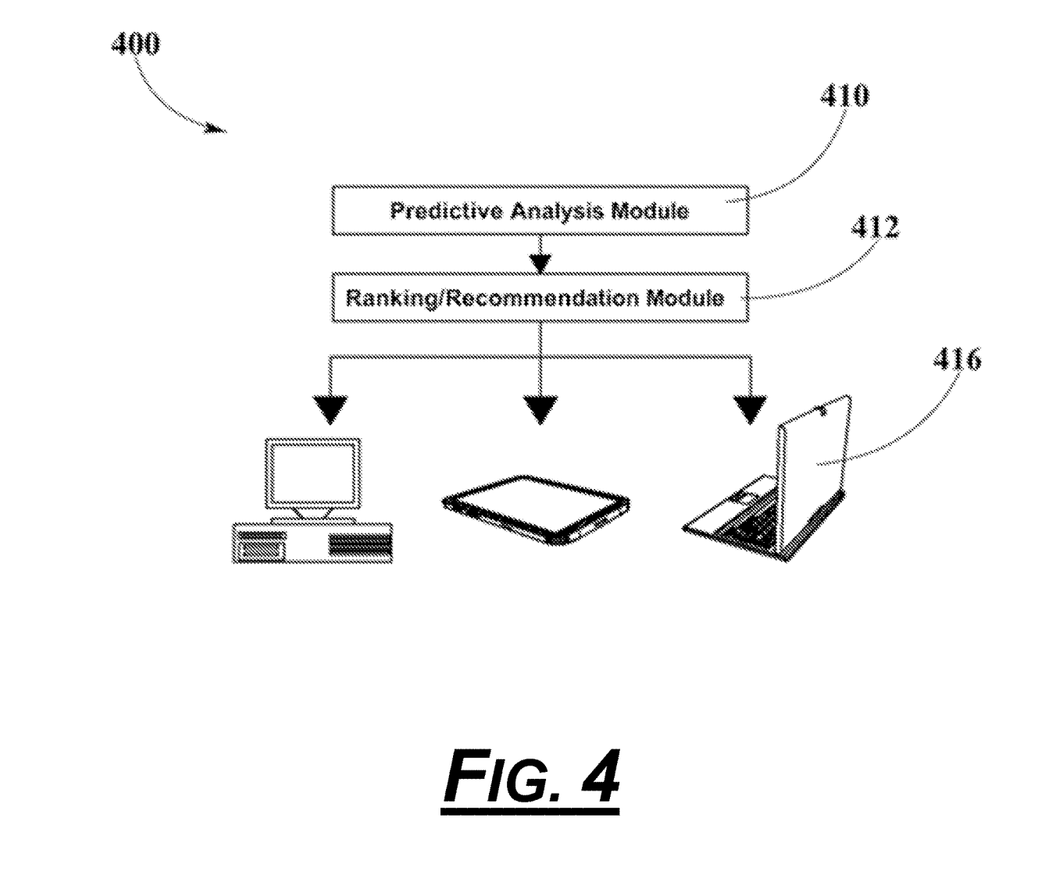
FIG. 4 illustrates a functional block diagram of another portion of an analytical engine for identifying and ranking successful agents, according to an exemplary embodiment.

FIG. 4 is an exemplary subsystem 400 that includes a portion of analytical engine 106, as well as other components of system architecture 100 for identifying and ranking successful agents. Subsystem 400 includes a predictive analysis module 410, a ranking/recommendation module 412, and one or more agent computing devices 416. It should be understood that analytical engine 106 can include less components, more components, or different components depending on the desired analysis goals. In an example and referring to FIG. 1, said predictive analysis module 410 is implemented as predictive analysis module 310 in subsystem 300 and predictive analysis module 110 in system architecture 100. Similarly, the ranking/recommendation 412 is implemented as ranking/recommendation module 112 in system architecture 100.

According to an embodiment, ranking/recommendation module 412 receives the results or information computed by predictive analysis module 410 in order to identify and rank prospective agents, in addition to providing evaluation and ranking reports on current or active agents. More specifically, ranking/recommendation module 412 may identify and rank prospective agents based on their probability of success determined by predictive analysis module 410. In another embodiment, ranking/recommendation module 412 may also rank active or current agents according their probability of success determined by predictive analysis module 410.

In another embodiment, ranking recommendation module 412 matches prospective agents to general agents based on analysis of key attributes performed by predictive analysis module 410. For example, ranking recommendation module 412 may determine that certain prospective agents, given their key attributes, may be best suited for working with a particular general agent covering a region that includes clients with more complex or sophisticated needs.

According to another embodiment, ranking/recommendation module 412 provides agent leads to one or more agent computing devices 416 which may be utilized by general agents or agents. In addition, ranking/recommendation module 412 provides ranking reports of current and prospective agents, and periodic evaluation reports or assessments on active agents. Agent computing devices 416 may be in communication with ranking/recommendation module 412 through suitable network connections, including intranets, local area networks (LAN), the cloud, virtual private networks (VPN), wireless area networks (WAN) and the internet among others.

Figure 5:
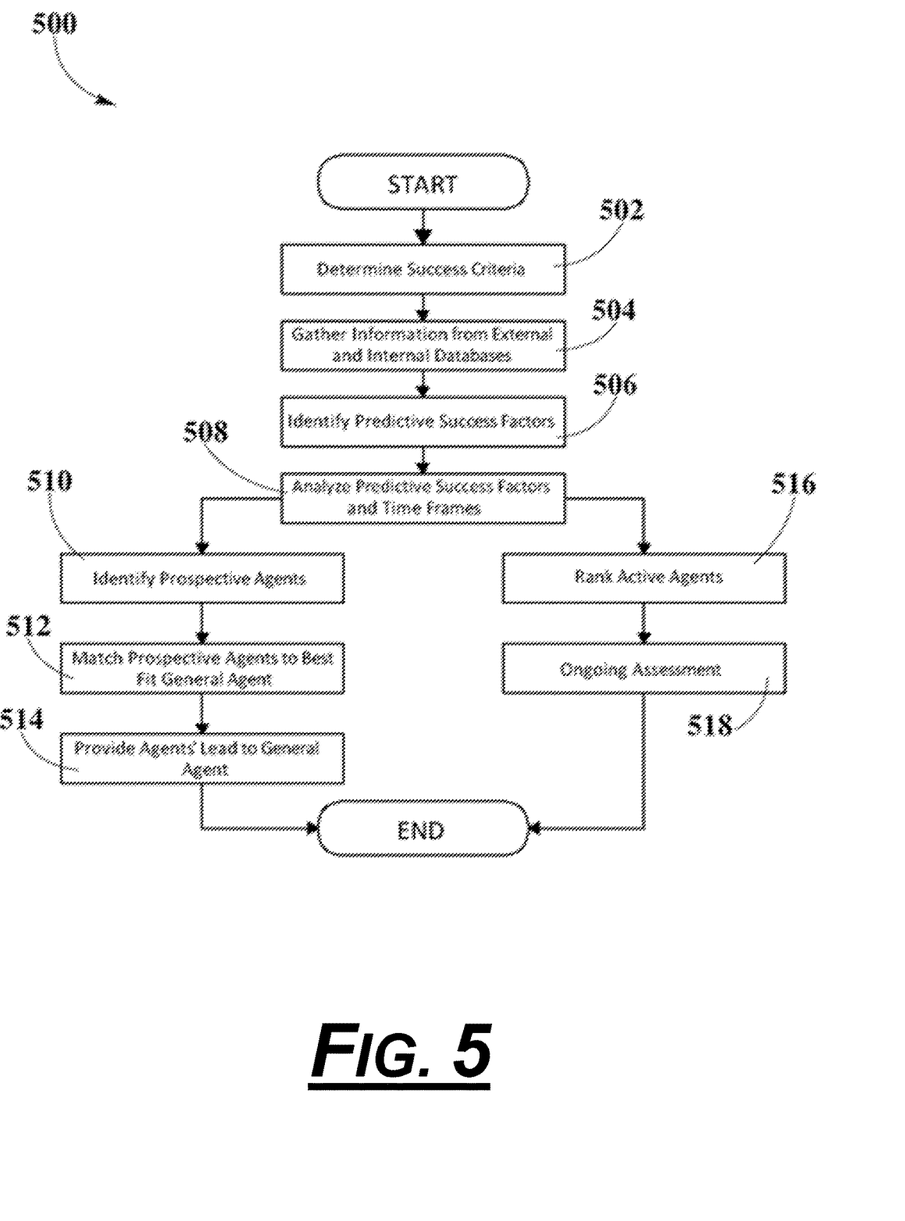
FIG. 5 depicts a flowchart of an exemplary process for the identification, ranking, and matching of agents, according to an exemplary embodiment.

FIG. 5 is a flowchart of an exemplary process 500 for identifying and ranking agents, according to an embodiment. A plurality of steps included in process 500 may be performed by one or more computing devices such as computing device 200 implementing/running one or more software modules/processes of the exemplary operating environments of FIGS. 1-4. The steps of this exemplary method are embodied in a computer readable medium containing a computer readable code such that the steps are implemented when the computer readable code is executed by a computing device. In some implementations, certain steps of the method can be combined, performed simultaneously, or in a different order, without deviating from the objective of the method.

Process 500 may start with defining a success criteria, at step 502. This success criteria may characterize a successful agent operation and it may be determined internally by the insurance or financial company according to business and human development objectives, and/or external circumstances such as market performance and competition. In an embodiment, success criteria may be fed to an analytical engine.

At step 504, an information gathering module in the analytical engine may collect and process information from an internal database and an external database. For example, resumes and background of prospective agents can be accessed through the external database, while profiles of active agents can be obtained from the internal database. The information collected and processed in the information gathering module can then be fed to a predictive analysis module within the analytical engine.

Using the information collected and processed by the information gathering module, the predictive analysis module may determine one or more key attributes or success factors that may be used for predicting the likelihood of success for prospective and current agents, at step 506. Examples of key attributes or success factors may include knowledge of the products to offer, college education and related professional licenses, people and communication skills, accessibility, intelligence coefficient, personality, quality of service provided to clients, experience, and periodic evaluation reports, among others.

Subsequently, at step 508, the predictive analysis module may perform quantitative and qualitative analysis on each of the key attributes or predictive success factors for weighting their relevance in the likelihood of success for potential and current agents. The predictive analysis module may use a probability algorithm for computing statistics, variability and trends regarding one or more key attributes or predictive success factors. In addition, the algorithm in the predictive analysis module may determine necessary timeframes for the development or first appearance of predictive factors or key attributes. For example, the algorithm in the predictive analysis module may determine that successful agents usually achieve a desired level of quality of service within the first 6 months of acquiring a new customer account.

Process 500 may include parallel or subsequent steps in which prospective agents may be identified and matched, and in which current agents may be ranked and evaluated. At step 510, a ranking/recommendation module in the analytical engine may identify one or more prospective agents based on the analysis performed in the predictive analysis module. Subsequently, the ranking/recommendation module may match the characteristics or attributes of the identified prospective agents to the profiles of one or more general agents, at step 512. For example, the ranking/recommendation module may determine that certain prospective agents may be best suited for working with a particular general agent covering a region that includes clients with more complex or sophisticated needs. The ranking/recommendation module may then send a list of identified potential agents to one or more agent computing devices, at step 514. One or more general agents may use this list of identified potential agents to expand operations and coverage, renew personnel, develop new products, and improve customer service, among other business activities.

In a parallel or subsequent sub-process, the ranking/recommendation module may use the results from the predictive analysis module to rank active or current agents, at step 516. This ranking may be based on the probability of success of active agents computed by the predictive analysis module. Furthermore, the ranking/recommendation module may send periodic ranking reports or performance assessment reports to one or more general agents through a suitable connection with one or more agent computing devices, at step 518. General agents may use these ongoing assessment reports of current agents for evaluating and following up their career developments.

By executing method 500 through the exemplary operating environments shown in FIGS. 1-4, big data analytics and data mining techniques can be implement for a more efficient and faster processing of larger data sets. In this way, efficiencies are created by providing the financial or insurance company with ways to automatically identify prospective agents and assess the likelihood of success of prospective and current agents. In addition, general agents of the financial or insurance company can receive automatic ranking reports of current and prospective agents, as well as periodic evaluation reports or assessments on current or active agents. These features allow performing large work such as heavy calculations and time consuming analysis in a more efficient manner than other approaches such as manual work performed by humans.

An exemplary embodiment is an application of the systems and process described in FIGS. 1-4 and FIG. 5. In this application, the system and process may be able to provide the names, profiles, and ranking of about 25 new prospective agents to the general agent of the New York City region. The general agent may use these agent leads in recruitment processes and expansion plans. In addition, the general agent may receive ranking and assessment reports on about 50 active or current agents under his supervision.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
  generating, by an information gathering module of an analytical engine computer, a user interface configured to receive a first attribute to evaluate performance of one or more users, wherein the first attribute corresponds to a value associated with success of the one or more users;
  upon displaying the user interface, receiving, by the information gathering module of the analytical engine computer, the first attribute;
  on a continuous basis:
    extracting, by the information gathering module of the analytical engine computer, from multiple social network databases that receive multiple social network feeds, social network data associated with the one or more users by searching one or more social networking web documents associated with the one or more users within the multiple social network databases and retrieving social network data from the one or more social networking web documents comprising one or more characteristic values associated with the one or more users;

retrieving, by the information gathering module of the analytical engine computer, from a profile database storing a record associated with the one or more users, profile data associated with the one or more users comprising a value associated with performance of each of the one or more users;

identifying, by a predictive analysis module of the analytical engine computer, one or more user attributes from the social network and profile data output from the information gathering module, the one or more user attributes indicative of a value associated with likelihood of user success;

determining, by the predictive analysis module of the analytical engine computer, a timeframe for each user attribute to become indicative of success;

performing, by the predictive analysis module of the analytical engine computer, predictive analysis on the one or more identified user attributes and the first attribute to determine the value associated with likelihood of user success;

ranking, by a ranking module of the analytical engine computer, the one or more users based on their respective values associated with likelihood of each user's success determined by the predictive analysis module;

identifying, by the ranking module of the analytical engine computer, a second user based on matching the one or more user attributes with a user attribute of the second user, wherein the second user has at least one common attribute with at least one of the one or more users; and updating, by the ranking module of the analytical engine computer, the user interface to display the rank associated with the one or more users on a computing device associated with the second user.

2. The method of claim 1, wherein the user is a prospective user, the method further comprising ranking the user based on the determined likelihood of user success.

3. The method of claim 2, further comprising:
providing, by the ranking module of the analytical engine computer, the second user with information regarding the one or more users including the corresponding predetermined ranking.

4. The method of claim 1, wherein the user is a current user, the method further comprising generating a report including a ranking of user including the current user.

5. The method of claim 1, wherein the one or more attributes are selected from the group consisting of product knowledge, an educational level, licensing status, an intelligence coefficient, and a quality of service indicator.

6. A system comprising:
a computer readable memory having stored thereon computer executable instructions for quantifying likelihood of agent success by an analytical engine computer; and
a processor coupled to the memory, the processor executing the instructions via the analytical engine, the instructions including:
a information gathering module configured to:
generate a user interface configured to receive a first attribute to evaluate performance of one or more users, wherein the first attribute corresponds to a value associated with success of the one or more users;
upon displaying the user interface, receive the first attribute;
continuously extract from multiple social network databases that receive multiple social network feeds, social network data associated with the one or more users by searching one or more social networking web documents associated with the one or more users within the multiple social network databases and retrieving social network data from the one or more social networking web documents comprising one or more characteristic values associated with the one or more users;
continuously retrieve from a profile database storing a record associated with the one or more users, profile data associated with the one or more users comprising a value associated with performance of each of the one or more users;
a predictive analysis module configured to, on a continuous basis:
identify one or more user attributes from social network and profile data output from the information gathering module, the one or more user attributes indicative of a value associated with likelihood of user success;
determine a timeframe for each user attribute to become indicative of success;
perform predictive analysis on the one or more identified user attributes to determine the value associated with likelihood of a value associated with user's success; and
a ranking module configured to, on a continuous basis:
ranking the one or more users based on their respective values associated with likelihood of each user's success determined by the predictive analysis module;
identify a second user based on matching the one or more user attributes with a user attribute of the second user, wherein the second user has at least one common attribute with at least one of the one or more users; and
update the user interface to display the rank associated with the one or more users on a computing device associated with the second user.

7. The system of claim 6, wherein the user is a prospective user, the instructions further comprising ranking the prospective user based on the determined likelihood of user success.

8. The system of claim 7, wherein the instructions further comprise:
providing the second user with information regarding the prospective user including the corresponding predetermined ranking.

9. The system of claim 6, wherein the agent is a current user, the instructions further comprising, generating a report including a ranking of user including the current user.

10. The system of claim 6, wherein the one or more attributes are selected from the group consisting of product knowledge, an educational level, licensing status, an intelligence coefficient, and a quality of service indicator.

11. A non-transitory computer readable medium having stored thereon computer executable instructions for quantifying likelihood of agent success by an analytical engine computer comprising an information gathering module, a predictive analysis module, and a ranking module, the instructions when executed by a processor perform a method comprising:
　generating, by the information gathering module of an analytical engine computer, a user interface configured to receive a first attribute to evaluate performance of one or more users, wherein the first attribute corresponds to a value associated with success of the one or more users;
　upon displaying the user interface, receiving, by the information gathering module of the analytical engine computer, the first attribute;
　on a continuous basis:
　　extracting, by the information gathering module of the analytical engine computer, from multiple social network databases that receive multiple social network feeds, social network data associated with the one or more users by searching one or more social networking web documents associated with the one or more users within the multiple social network databases and retrieving social network data from the one or more social networking web documents comprising one or more characteristic values associated with the one or more users;
　　retrieving, by the information gathering module of the analytical engine computer, from a profile database storing a record associated with the one or more users, profile data associated with the one or more users comprising a value associated with performance of each of the one or more users;
　　identifying, by the predictive analysis module of the analytical engine computer, one or more user attributes from the social network and profile data output from the information gathering module, the one or more user attributes indicative of a likelihood of a value associated with user's success;
　　determining, by the predictive analysis module of the analytical engine computer, a timeframe for each user attribute to become indicative of success;
　　performing, by the predictive analysis module of the analytical engine computer, predictive analysis on the one or more identified user attributes to determine the likelihood of a value associated with user's success;
　　ranking, by the ranking module of the analytical engine computer, the one or more users based on their respective values associated with each user's success likelihood of success;
　　identifying, by the ranking module of the analytical engine computer, a second user based on matching the user attributes of the one or more users to a user attribute of the second user, wherein the second user has at least one common attribute with at least one of the one or more users;
　　updating, by the ranking module of the analytical engine computer, the user interface to display the rank associated with the one or more users on a computing device associated with the second user.

12. The computer-readable medium of claim 11, wherein the user is a prospective user, the instructions further comprising, ranking the prospective user based on the determined likelihood of user success.

13. The computer-readable medium of claim 12, wherein the instructions further comprise:
　providing the general user with information regarding the prospective user including the corresponding predetermined ranking.

14. The computer-readable medium of claim 11, wherein the user is a current user, the instructions further comprise generating a report including a ranking of user including the current user.

15. The computer readable-medium of claim 11, wherein the one or more attributes are selected from the group consisting of product knowledge, an educational level, licensing status, an intelligence coefficient, and a quality of service indicator.

* * * * *